United States Patent
Garvey

(10) Patent No.: US 9,463,524 B2
(45) Date of Patent: Oct. 11, 2016

(54) SYSTEM AND METHOD FOR ADJUSTING FEED ROLL POSITION IN A WELDING TORCH

(75) Inventor: Paul William Garvey, Kaukauna, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 899 days.

(21) Appl. No.: 13/523,577

(22) Filed: Jun. 14, 2012

(65) Prior Publication Data

US 2013/0334190 A1    Dec. 19, 2013

(51) Int. Cl.
| | | |
|---|---|---|
| *B23K 9/12* | (2006.01) | |
| *B23K 9/133* | (2006.01) | |
| *B23K 9/32* | (2006.01) | |
| *B23K 9/29* | (2006.01) | |

(52) U.S. Cl.
CPC ............ *B23K 9/1336* (2013.01); *B23K 9/295* (2013.01); *B23K 9/32* (2013.01)

(58) Field of Classification Search
CPC ....... B23K 9/1336; B23K 9/32; B23K 9/295
USPC ................. 219/137.7, 137.31, 143
See application file for complete search history.

(56) References Cited

U.S. PATENT DOCUMENTS

| | | |
|---|---|---|
| 1,873,326 A | 8/1932 | Ratigan |
| 2,719,245 A | 9/1955 | Anderson |
| 3,016,451 A | 1/1962 | Cornell |
| 3,055,591 A | 9/1962 | Shepard |
| 3,734,369 A | 5/1973 | Johnson |
| 4,527,037 A | 7/1985 | Johnson |
| 4,703,156 A | 10/1987 | Hayes |
| 4,954,690 A | 9/1990 | Kensrue |
| 5,410,126 A | 4/1995 | Miller |
| 5,816,466 A | 10/1998 | Seufer |
| 6,286,748 B1 | 9/2001 | Cooper |
| 6,388,234 B1 | 5/2002 | Collins |

(Continued)

FOREIGN PATENT DOCUMENTS

| | | |
|---|---|---|
| DE | 20113852 | 11/2001 |
| EP | 1577245 A2 | 9/2005 |

(Continued)

OTHER PUBLICATIONS

U.S. Appl. No. 13/797,301, filed Mar. 12, 2013, Paul William Garvey.

(Continued)

*Primary Examiner* — Dana Ross
*Assistant Examiner* — James Sims, III
(74) *Attorney, Agent, or Firm* — Fletcher Yoder P.C.

(57) ABSTRACT

A welding system includes a welding torch assembly including a body, a first feed roll, a second feed roll, and a lever. The first and second feed rolls are both configured to rotate with respect to the body, and the first and second feed rolls are disposed opposite from one another about a welding wire feed region. The lever is configured to pivot at a first end of the lever about a lever joint of the body, and the second feed roll is movable between a first position and a second position in response to movement of a second end of the lever. The second feed roll is adjacent to the first feed roll in the first position, the second feed roll is not adjacent to the first feed roll in the second position, and the lever is configured to maintain the feed roll in the second position.

7 Claims, 10 Drawing Sheets

(56) References Cited

U.S. PATENT DOCUMENTS

| | | |
|---|---|---|
| 6,427,894 B1 | 8/2002 | Blank |
| 6,536,644 B2 | 3/2003 | Plow |
| 6,557,742 B1 | 5/2003 | Bobeczko |
| 6,568,578 B1 | 5/2003 | Kensrue |
| 7,244,909 B2 | 7/2007 | Kensrue |
| 7,301,124 B2 | 11/2007 | Kaufman |
| 7,374,074 B2 | 5/2008 | Matiash |
| 7,615,723 B2 | 11/2009 | Matiash |
| 7,767,934 B2 | 8/2010 | Christopher et al. |
| 7,977,604 B2 | 7/2011 | Ertmer |
| 2002/0130153 A1 | 9/2002 | Plow |
| 2003/0015510 A1 | 1/2003 | Wakeman |
| 2005/0016976 A1 | 1/2005 | Belfiore |
| 2005/0040202 A1 | 2/2005 | Kerekes |
| 2005/0224486 A1 | 10/2005 | Matiash |
| 2006/0219683 A1 | 10/2006 | Kensrue |
| 2006/0278623 A1 | 12/2006 | Christopher |
| 2009/0277890 A1 | 11/2009 | Leiteritz |
| 2011/0220628 A1 | 9/2011 | Mehn |
| 2012/0152924 A1 | 6/2012 | Christopher |
| 2012/0152926 A1 | 6/2012 | Matiash |
| 2012/0248084 A1 | 10/2012 | Romenesko |
| 2013/0334190 A1 | 12/2013 | Garvey |
| 2015/0014383 A1 | 1/2015 | Patterson |

FOREIGN PATENT DOCUMENTS

| | | |
|---|---|---|
| EP | 2476500 | 7/2012 |
| GB | 1093736 | 12/1967 |
| WO | 0128728 | 4/2001 |
| WO | 03022501 A2 | 3/2003 |
| WO | 2008018960 | 2/2008 |
| WO | 2008018961 | 2/2008 |
| WO | 2013033849 | 3/2013 |

OTHER PUBLICATIONS

U.S. Appl. No. 13/939,949, filed Jul. 11, 2013, John Michael Patterson.

International Search Report from PCT application No. PCT/US2014/045166, dated Nov. 5, 2014, 10 pgs.

International Search Report from PCT application No. PCT/US2013/045280 dated Oct. 18, 2013, 9 pgs.

International Search Report from PCT application No. PCT/US2014/017224, dated Aug. 12, 2014, 8 pgs.

SYSTEM AND METHOD FOR ADJUSTING FEED ROLL POSITION IN A WELDING TORCH

BACKGROUND

The invention relates generally to welding systems and, more particularly, to a welding torch operable with such systems.

Welding is a process that has increasingly become ubiquitous in various industries and applications. While such processes may be automated in certain contexts, a large number of applications continue to exist for manual welding operations. Such welding operations rely on a variety of types of equipment to ensure the supply of welding consumables (e.g., wire feed, shielding gas, etc.) is provided to the weld in an appropriate amount at a desired time. For example, metal inert gas (MIG) welding typically enables formation of a continuous weld bead by feeding welding wire shielded by inert gas through a welding torch.

The welding torch may include a wire drive assembly to help feed welding wire through the torch. Such torches are commonly used in applications using aluminum and aluminum alloy wires, which otherwise may not support the stresses associated with being pushed from a separate welding wire feeder to the torch. The wire drive assembly in the torch allows for the welding wire to be both pushed by a motor in a wire feeder and pulled by a small motor in the torch. Positioning the wire drive assembly in the torch also allows for efficient control and operation of the wire drive assembly, because an operator is not required to return to the power source, which may be located hundreds of feet from the welding process, to make adjustments.

During a welding process, the consumable welding wire passes between a pair of feed rolls of the wire drive assembly. At least one feed roll is operated by the motor in the torch to feed the welding wire between the feed rolls and through the torch. The feed rolls are often separable to facilitate an initial positioning (e.g., threading) of the welding wire between the feed rolls. Unfortunately, it is sometimes difficult to maintain the feed rolls in a separated position for proper threading of the welding wire between the feed rolls. This may cause the welding wire to come out of its desired position between the feed rolls, leading to an inefficient use of time spent rethreading the wire.

In addition, welding wire is generally received into the torch through a structure at the rear of the torch, while the wire drive assembly is located at an opposite end of the torch. The welding wire may pass through the length of the torch, between the rear structure and the wire drive assembly. Unfortunately, constraints on the dimensions of the torch may lead to a crowded assembly of components between the rear structure and the wire drive assembly, making it difficult to route the welding wire through the torch. In addition, the dimension constraints may limit the type and relative placement of the motor used to operate the wire drive assembly.

BRIEF DESCRIPTION

In an exemplary embodiment, a welding system includes a welding torch assembly including a body, a first feed roll, a second feed roll, and a lever. The first and second feed rolls are both configured to rotate with respect to the body, and the first and second feed rolls are disposed opposite from one another about a welding wire feed region. The lever is configured to pivot at a first end of the lever about a lever joint of the body, and the second feed roll is movable between a first position and a second position in response to movement of a second end of the lever. The second feed roll is adjacent to the first feed roll in the first position, the second feed roll is not adjacent to the first feed roll in the second position, and the lever is configured to maintain the feed roll in the second position.

In another embodiment, a welding torch assembly includes a body, a first feed roll coupled to the body, a second feed roll configured to rotate with respect to the body, and a lever. The second feed roll is movable relative to the first feed roll between a feed position and an open position, and the lever is configured to move the second feed roll between the feed position and the open position. The lever has a first end rotatably coupled to the body and a second end extending from the first end. The second feed roll is adjacent to the first feed roll in the feed position, and the second feed roll is not adjacent to the first feed roll in the open position In a further embodiment, a method includes urging a first feed roll between a feed position and an open position relative to a second feed roll via a lever rotatably coupled to a body in a welding torch. The method also includes maintaining the first feed roll in the feed position adjacent to the second feed roll when the lever is positioned in a first orientation relative to the body. Further, the method includes maintaining the first feed roll in the open position away from the second feed roll when the lever is positioned in a second orientation relative to the body. The second orientation is offset from the first orientation by approximately 90-115 degrees along a plane.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Presently contemplated embodiments are directed toward systems and methods for positioning wire feed rolls in a push-pull welding torch. A lever rotatably coupled to a wire drive assembly body in the torch may be pivoted between two orientations. The lever is configured to move the feed rolls between an open position and a feed position in response to movement of the lever. When the lever is in a first orientation (e.g., horizontal orientation), a spring pushes on an arm coupled to one of the feed rolls to maintain the feed rolls in the feed position. When the lever is pivoted to a second orientation (e.g., vertical orientation), a cam surface of the lever urges the arm, moving one feed roll away from the other feed roll. The lever maintains the feed rolls in this open position so that an operator may insert (i.e., thread) the welding wire between the feed rolls and/or service the wire drive assembly. The torch may include a housing having a door that opens to expose at least the feed rolls and the lever. When the lever is in an upright position (e.g., for moving the feed rolls to the open position), the lever may block the door from closing over the wire drive assembly. Once the lever is returned to the first orientation of the feed position, the door may be closed over the wire drive assembly.

Figure 1:
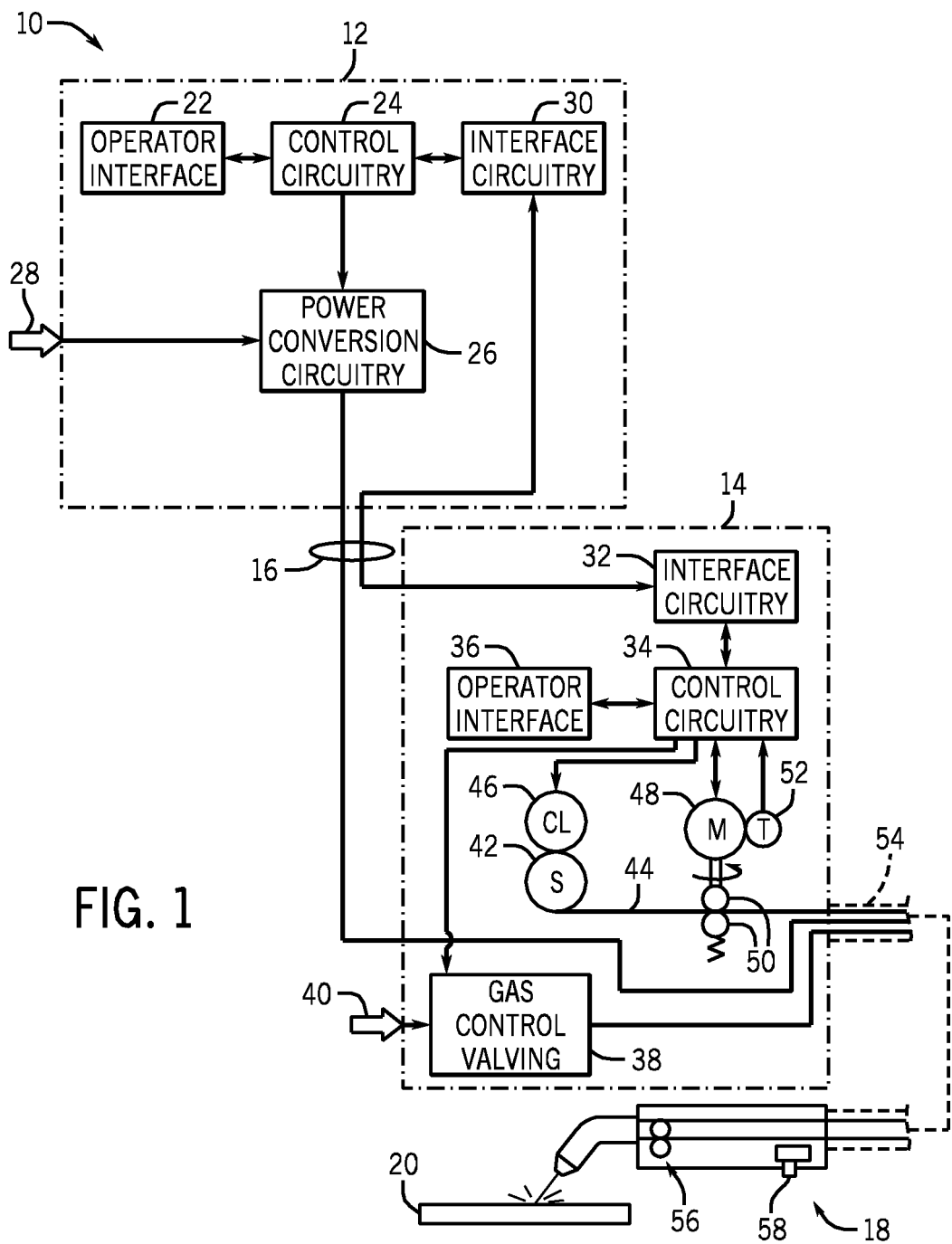
FIG. 1 is a diagrammatical representation of an embodiment of a welding system illustrating a welding torch coupled to a wire feeder.

Turning now to the figures, FIG. 1 is an exemplary embodiment of a welding system 10, which includes a power supply 12 and a wire feeder 14 coupled to one another via conductors or conduits 16. In the illustrated embodiment, the power supply 12 is separate from the wire feeder 14, such that the wire feeder 14 may be positioned at some distance from the power supply 12 near a welding location. However, it should be understood that the wire feeder 14, in some implementations, may be integral with the power supply 12. In such cases, the conduits 16 would be internal to the system. In embodiments in which the wire feeder 14 is separate from the power supply 12, terminals are typically provided on the power supply 12 and on the wire feeder 14 to allow the conductors or conduits 16 to be coupled to the devices so as to allow for power and gas to be provided to the wire feeder 14 from the power supply 12, and to allow data to be exchanged between the two devices, as described more fully below.

The system 10 is designed to provide wire, power, and shielding gas to a welding torch 18. The torch 18 may be of many different types, and generally allows for the feed of a welding wire and shielding gas to a location adjacent to a workpiece 20, where a weld is to be formed to join two or more pieces of metal. A second conductor (not shown) is typically run to the welding workpiece 20 to complete an electrical circuit between the power supply 12 and the workpiece 20.

The system 10 is designed to allow for data settings to be selected by the operator, particularly via an operator interface 22 provided on the power supply 12. The operator interface 22 will typically be incorporated into a front faceplate of the power supply 12, and may allow for selection of settings such as the type of weld process, the type of wire to be used, voltage and current settings, and so forth. In particular, the system 10 is designed to allow for metal inert gas (MIG) welding with aluminum or other welding wire that is both pushed towards the torch 18 and pulled through the torch 18. These weld settings are communicated to control circuitry 24 within the power supply 12. It should be noted that while reference is made in the present disclosure to "MIG" welding, the torch 18 and techniques described may be used with or without inert gas, such as with flux cored or metal cored wires.

The control circuitry 24 operates to control generation of welding power output that is applied to the welding wire for carrying out the desired welding operation. Accordingly, the control circuitry 24 is coupled to power conversion circuitry 26. This power conversion circuitry 26 is adapted to create the output power that will ultimately be applied to the welding wire at the torch 18. Various power conversion circuits may be employed, including choppers, boost circuitry, buck circuitry, inverters, converters, and so forth. The power conversion circuitry 26 is coupled to a source of electrical power, as indicated by arrow 28. The power applied to the power conversion circuitry 26 may originate in the power grid, although other sources of power may also be used, such as power generated by an engine-driven generator, batteries, fuel cells or other alternative sources. Finally, the power supply 12 illustrated in FIG. 1 includes interface circuitry 30 configured to allow the control circuitry 24 to exchange signals with the wire feeder 14.

The wire feeder 14 includes complimentary interface circuitry 32 that is coupled to the interface circuitry 30. The wire feeder 14 also includes control circuitry 34 coupled to the interface circuitry 32. The control circuitry 34 allows for wire feed speeds to be controlled in accordance with operator selections. The control circuitry 34 is coupled to an operator interface 36 on the wire feeder 14 that allows selection of one or more welding parameters, particularly wire feed speed. The operator interface 36 also may allow for selection of such weld parameters as the type of welding process, the type of wire utilized, current, voltage or power settings, and so forth. The control circuitry 34 is coupled to gas control valving 38, which regulates the flow of shielding gas to the torch 18. In general, such gas is provided at the time of welding, and may be turned on immediately preceding welding and/or for a short time following welding. The gas supplied to the gas control valving 38 is typically provided in the form of pressurized bottles, as represented in FIG. 1 by arrow 40.

The wire feeder 14 includes components for feeding wire to the welding torch 18, and thereby to the welding application, under the control of control circuitry 34. For example, one or more spools 42 of welding wire are housed in the wire feeder 14. Welding wire 44 is unspooled from the spools 42 and is progressively fed to the torch 18 as described below. Each of the spools 42 may be associated with a clutch 46 that disengages the spool 42 when the welding wire 44 is to be fed to the torch 18. The clutch 46 may be regulated to maintain a minimum friction level to avoid free spinning of the spool 42. A feed motor 48 is provided that engages with wire feeder feed rolls 50 to push the welding wire 44 from the wire feeder 14 towards the torch 18. In practice, one of the feed rolls 50 is mechanically coupled to the feed motor 48 and is rotated by the feed motor 48 to drive the welding wire 44 from the wire feeder 14, while the mating feed roll is biased towards the welding wire 44 to maintain good contact between the feed rolls 50 and the welding wire 44. Some systems may include multiple rollers of this type. Finally, in certain embodiments, a tachometer 52 is provided for detecting the speed of the feed motor 48, the feed rolls 50, or any other associated component in order to provide an indication of the actual wire feed speed. Signals from the tachometer 52 are fed back to the control circuitry 34.

It should be noted that other system arrangements and input schemes may be implemented. For example, the welding wire 44 may be fed from a bulk storage container (e.g., a drum) or from one or more spools outside of the wire feeder 14. Similarly, the welding wire 44 may be fed from a "spool gun" in which the spool 42 is mounted on or near the welding torch 18. As noted herein, the wire feed speed settings may be input via the operator input 36 on the wire feeder 14, on the operator interface 22 of the power supply 12, or both. In systems having wire feed speed adjustments on the torch 18, this may be the input used for the setting.

Power from the power supply 12 is applied to the welding wire 44, typically by means of a weld cable 54. Similarly, shielding gas is fed through the wire feeder 14 and the weld cable 54. During welding operations, the welding wire 44 is advanced through the weld cable jacket towards the torch 18. Within the torch 18, an additional wire drive assembly 56 is provided with associated feed rolls, as described in detail below. The feed rolls contact the welding wire 44 and drive the welding wire 44 from the wire feeder 14 to a welding application. A trigger switch 58 within the torch 18 provides a signal that is fed back to the wire feeder 14 and therefrom back to the power supply 12 to enable the welding process to be started and stopped by the operator. That is, upon depression of the trigger switch 58, gas flow is begun, wire is advanced, and power is applied to the weld cable 54 and through the torch 18 to the advancing welding wire 44.

Figure 2:
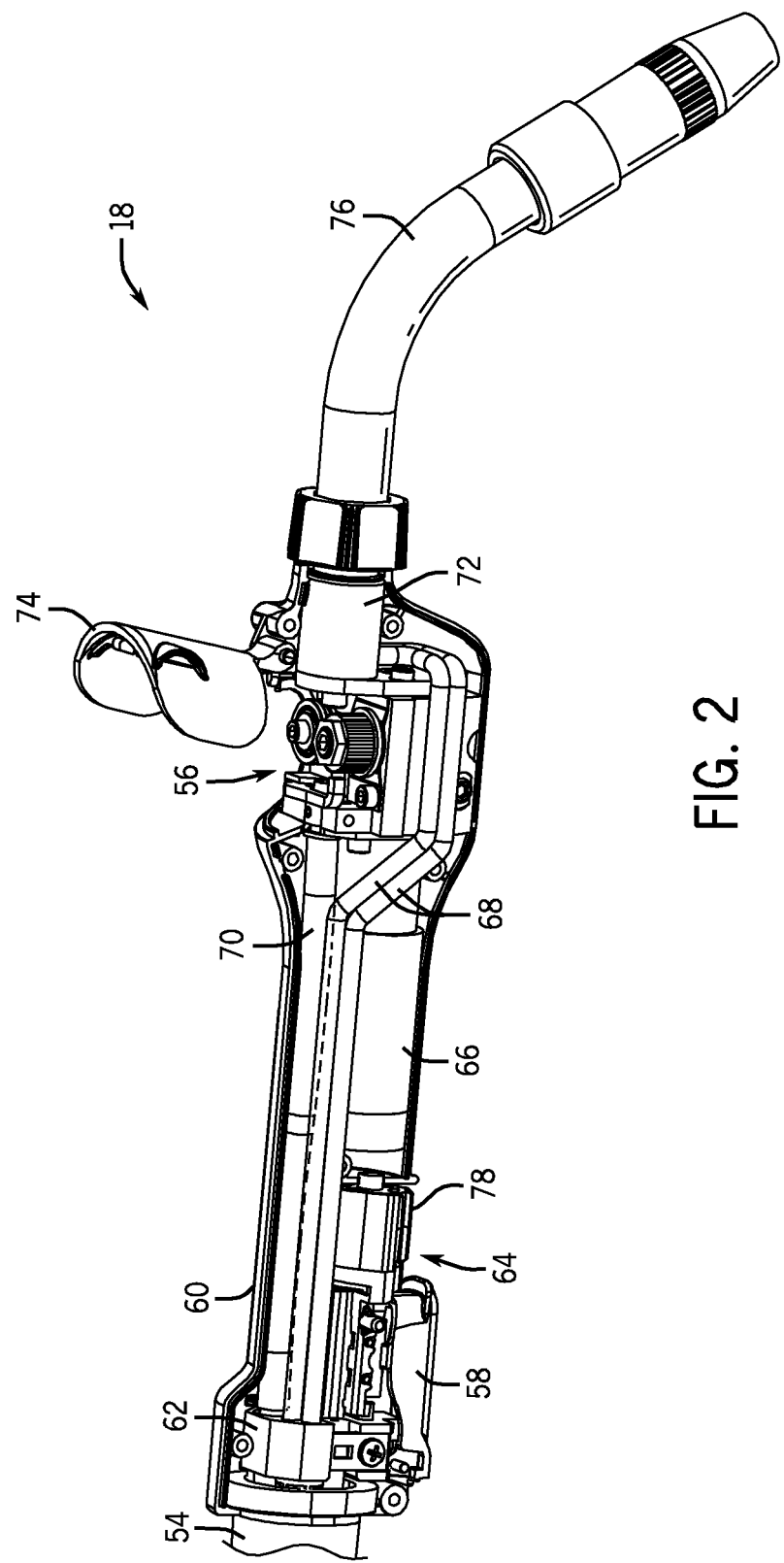
FIG. 2 is a partial cutaway perspective view of an embodiment of certain components of the welding torch of FIG. 1.

FIG. 2 is a partial cutaway perspective view of an embodiment of certain components of the torch 18, which are enclosed in a housing 60. These components may include a rear block 62, a feed control assembly 64, a motor 66, one or more conductor tubes 68, a curved guide structure 70, the wire drive assembly 56, and a barrel mount 72. As discussed in detail below, these components facilitate the feeding of consumables (e.g., welding wire 44, electricity, shielding gas) toward a welding application at a desired rate. The illustrated embodiment shows only a portion of the housing 60 that contains these components of the torch 18. When the torch 18 is fully assembled, the housing 60 completely encloses the components and forms a handle through which an operator can manipulate the torch 18. The housing 60 may be molded plastic or any other material suitable for holding the torch components. There may be an opening in the housing 60, covered by a door 74. The door 74 may be opened to expose the wire drive assembly 56 as desired. As discussed in further detail below, the components are arranged in a relatively compact configuration within the housing 60 to reduce a size and/or weight of the torch 18. This reduction in size and/or weight may benefit welding operators by increasing maneuverability of the torch 18 and decreasing the load on the operator.

As outlined above with respect to FIG. 1, the torch 18 enables feeding of the welding wire 44 from the weld cable 54 toward a welding application (e.g., for forming a weld on the workpiece 20). In particular, the welding wire 44 enters the torch 18 through an aperture in the rear block 62, passes through the curved guide structure 70, and is fed through the wire drive assembly 56. As mentioned above, the welding wire 44 may be pushed from a pair of feed rolls 50 in the wire feeder 14 and simultaneously pulled through the feed rolls in the torch 18. The feed rolls of the wire drive assembly 56 exert a compressive force on the welding wire 44 and rotate in opposite directions to pull the welding wire 44 through a welding wire feed region. At certain times, it may be desirable for the door 74 to be opened, exposing the wire drive assembly 56 (e.g., during initial threading of the welding wire 44, servicing or cleaning of the wire drive assembly 56, and so forth). From the wire drive assembly 56, the welding wire 44 passes through the barrel mount 72, where it receives an electrical charge. Finally, a nozzle 76 of the torch 18 outputs the charged welding wire 44 toward the workpiece 20.

The feed control assembly 64 may adjust a wire feed speed of the welding wire 44 through the torch 18 based on input from an operator. For example, the operator may depress the trigger switch 58 to initiate feeding of the welding wire 44 through the torch 18, and the operator may adjust the wire feed speed by turning a dial 78 of the feed control assembly 64. Thus, the feed control assembly enables one-handed control of the speed of the welding wire 44 exiting the torch 18.

The torch 18 also outputs shielding gas and electricity to the welding application. The weld cable 54 routes a desired electric current and a desired flow rate of shielding gas from the wire feeder 14 to the torch 18, as governed by the control circuitry 24 and 34 of the power supply 12 and the wire feeder 14, respectively. The electricity flows into the rear block 62 and through the conductor tubes 68 toward the barrel mount 72. The rear block 62 is a rear structure of the torch 18 with apertures formed therein. One of the apertures is for the welding wire 44 to pass through, while at least one other aperture is for conveying shielding gas from the weld cable 54 into the hollow conductor tubes 68. The rear block 62, conductor tubes 68, and barrel mount 72 may each be constructed from relatively conductive materials (e.g., copper, copper alloys, etc.) and brazed together, minimizing electrical resistance through the torch 18. The illustrated embodiment includes two conductor tubes 68 for routing the shielding gas and electricity through the torch 18. That is, the electricity flows through the structure of the conductor tubes 68, while the shielding gas flows through the hollow portion of the conductor tubes 68. In other embodiments, the conductor tubes 68 may convey only the shielding gas without the electricity, which is conveyed by one or more other conductive components of the torch 18. Other numbers (e.g., 1, 3, 4, etc.) of conductor tubes 68 may be present in other embodiments, depending on the desired current loads and/or shielding gas flow rates for the welding application. For example, when less current and/or less shielding gas is desired for a given welding application, the torch 18 may be able to convey the desired current and gas using a single conductor tube 68. Upon arriving at the barrel mount 72, the shielding gas flows through the nozzle 76 to shield the weld area throughout the welding process, as described above. The electric current flows from the barrel mount 72 to the welding wire 44 as the welding wire 44 exits the torch 18 through the nozzle 76.

Figure 3:
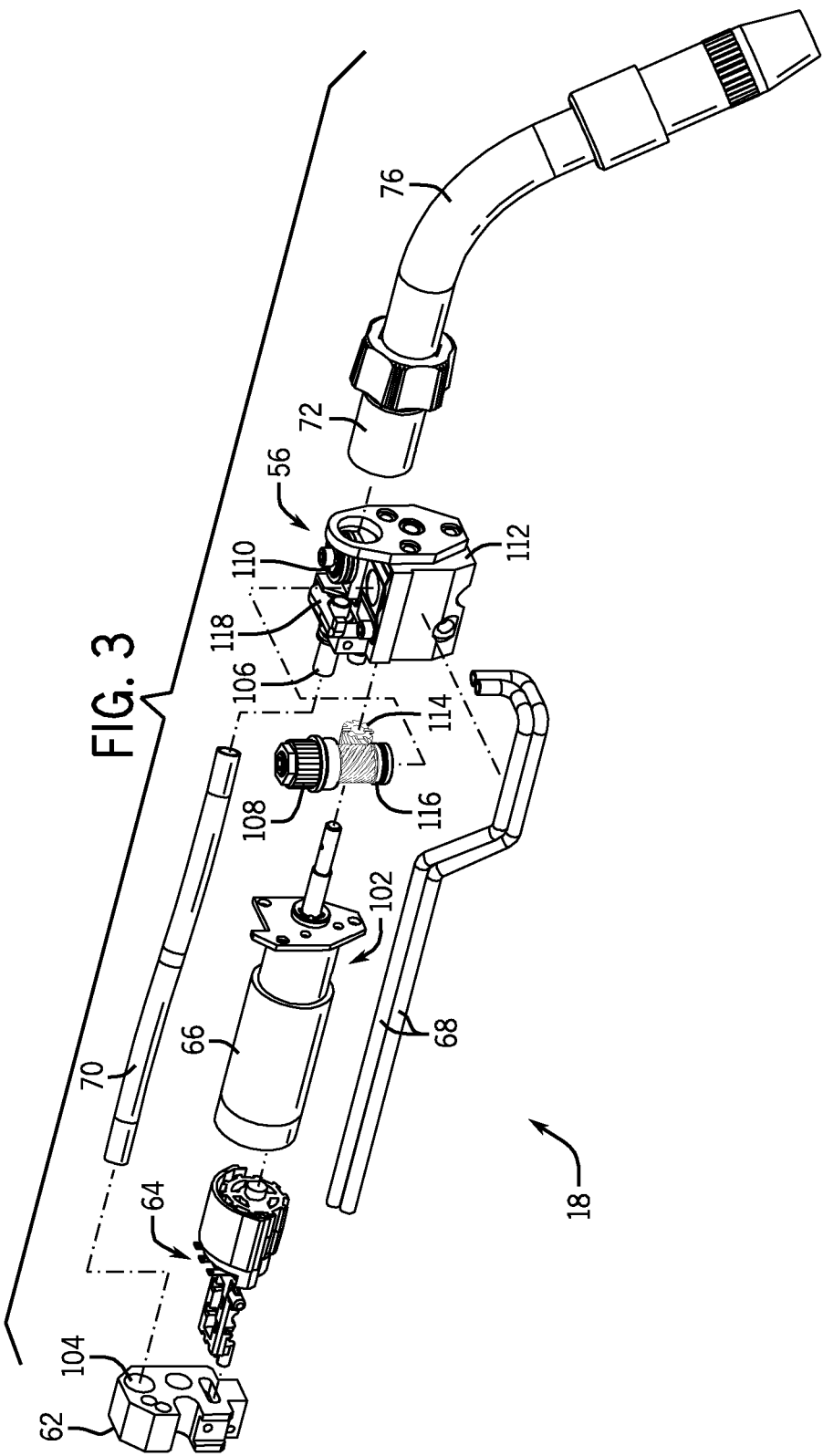
FIG. 3 is an exploded perspective view of an embodiment of components of the welding torch of FIG. 1.

FIG. 3 is an exploded perspective view of an embodiment of certain components of the torch 18. These components include the rear block 62, the feed control assembly 64, a motor assembly 102 that includes the motor 66, the conductor tubes 68, the curved guide structure 70, the wire drive assembly 56, and the nozzle 76. The illustrated curved guide structure 70, motor assembly 102, and wire drive assembly 56 of the torch 18 may offer benefits over other welding torches used with push-pull welding systems.

The curved guide structure 70 is configured to guide the welding wire 44 between the rear block 62 and the wire drive assembly 56. More specifically, the curved guide structure 70 is a continuous structure coupled between the rear block 62 and the wire drive assembly 56, and is configured to guide the welding wire 44 from an aperture 104 in the rear block 62 to an inlet wire guide 106 of the wire drive assembly 56. The aperture 104 may be offset relative to the inlet wire guide 106 with respect to an axial centerline of the torch 18, allowing a relatively smaller rear block 62 to be used in the torch 18. The smaller rear block 62 may contribute to the compactness of the torch design. As a result of the offset aperture 104, the welding wire 44 does not follow a straight path through the torch 18. The curved guide structure 70 is designed to guide the welding wire 44 in a continuous and gently curved manner between the aperture 104 and the inlet wire guide 106, minimizing wear that occurs on the welding wire 44 as it passes through the torch 18.

The motor assembly 102 powers the rotation of feed rolls in the wire drive assembly 56 for feeding the welding wire 44 through the torch 18. The wire drive assembly 56 includes a driver feed roll 108 and an idler feed roll 110. Both of the feed rolls 108 and 110 are able to rotate with respect to a body 112 of the wire drive assembly 56. However, the driver feed roll 108 rotates in response to actuation by the motor assembly 102, while the idler roller 110 rotates freely in response to rotation of the driver feed roll 108. The motor assembly 102 rotates the driver feed roll 108 at an appropriate speed for feeding the welding wire 44 through the welding torch 18 based on operator input. The motor assembly 102 includes the motor 66, which turns a driving helical gear 114. The driving helical gear 114 engages with a driven helical gear 116, which is axially coupled to the driver feed roll 108. This arrangement allows the motor 66 to drive the rotation of the driver feed roll 108. In presently contemplated embodiments, the motor 66 is aligned longitudinally with the torch 18, but the motor 66 is offset from a plane defined by the contact area between the feed rolls 108 and 110. The distance of this offset, size and/or rating of the motor 66, gear reduction of the helical gears 114 and 116, and diameter of the driver feed roll 108 may be adjusted to provide a desired range of wire feed speeds through the torch 18.

In certain contexts, it may be desirable to separate the feed rolls 108 and 110 (e.g., to thread the welding wire 44 therebetween). The wire drive assembly 56 of the illustrated torch 18 includes a lever 118 that may be positioned to separate the feed rolls 108 and 110. More specifically, the lever 118 may be positioned to move the idler feed roll 110 away from the driver feed roll 108 and to maintain the idler feed roll 110 in an open position. This may enable hands-free separation of the feed rolls 108 and 110 during threading, cleaning, and/or adjusting of the wire drive assembly 56.

In the following discussion, reference may be made to an upstream location or direction and a downstream location or direction. The terms upstream and downstream refer to the direction along a central longitudinal axis of the torch 18 through which the welding wire 44 passes through the torch 18. That is, the weld cable 54 attaches to the rear block 62 at an upstream end of the torch 18 for providing the welding wire 44 to the torch 18. Likewise, the wire drive assembly 56 and the nozzle 76 are located at a downstream end of the torch 18, in order to feed the welding wire 44 toward a welding application that is still further downstream.

Figure 4:
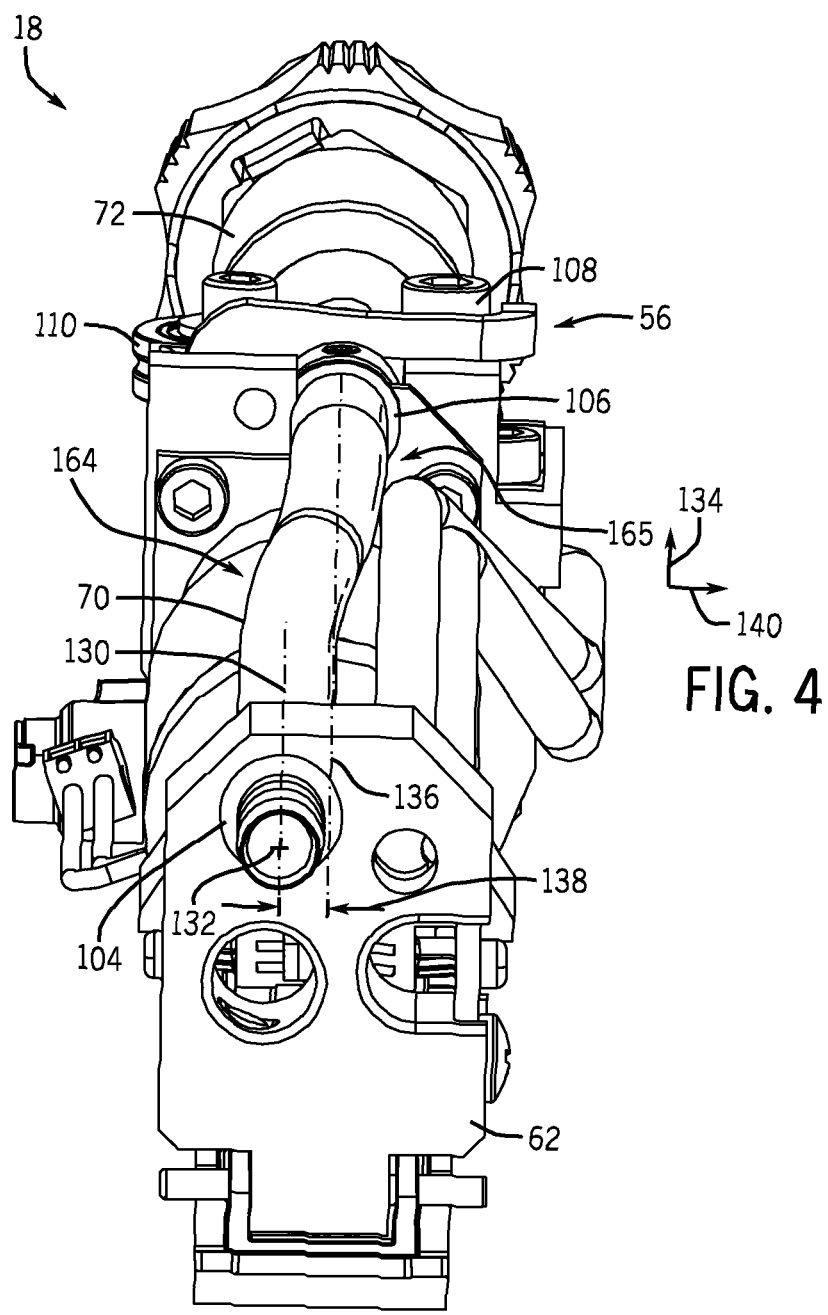
FIG. 4 is a perspective view of an embodiment of the welding torch of FIG. 3 including a curved guide structure.
Figure 5:
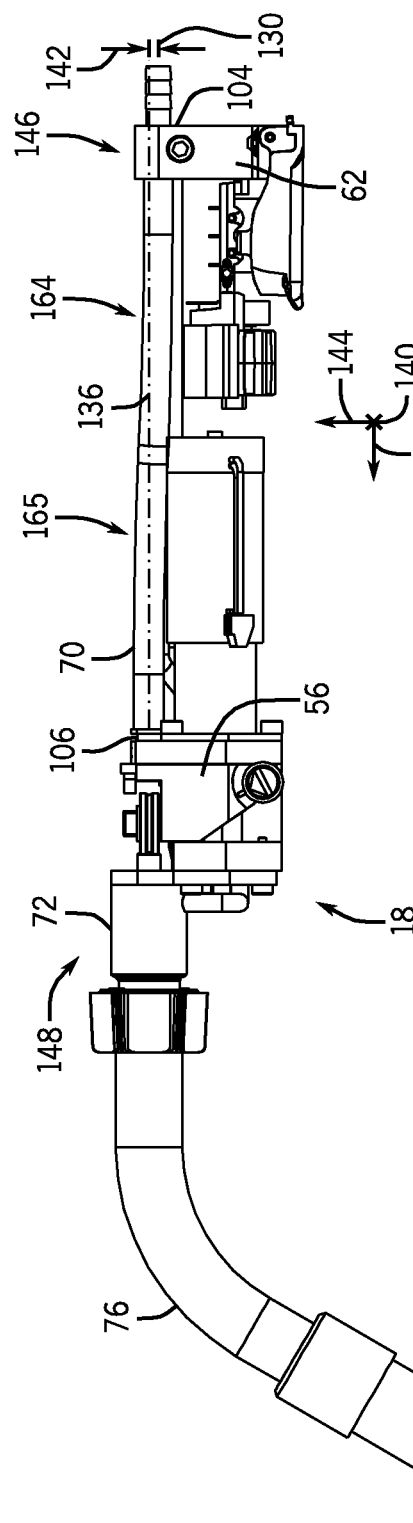
FIG. 5 is a side view of an embodiment of the welding torch of FIG. 4.
Figure 6:
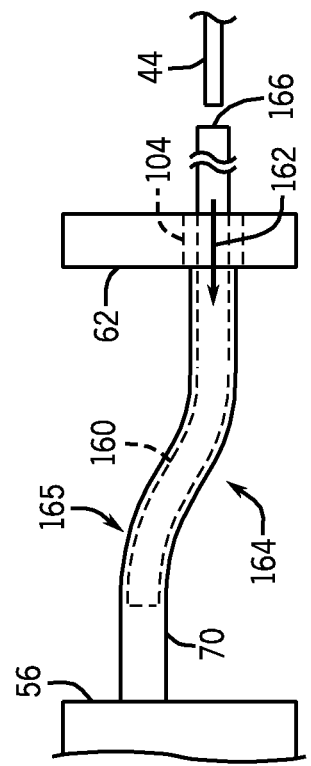
FIG. 6 is a diagrammatical representation of an embodiment of the curved guide structure of FIG. 4 receiving a welding wire liner.

FIGS. 4-6 illustrate the curved guide structure 70 used to guide the welding wire 44 through the torch 18. The curved guide structure 70 is a continuous guide structure, having one inlet and one outlet. In addition, the curved guide structure 70 forms a conduit through which the welding wire 44 moves between a rear structure (e.g., rear block 62) and a forward structure (e.g., wire drive assembly 56) of the torch 18. As previously described, the rear structure includes a rear structure aperture (e.g., aperture 104) through which the welding wire 44 is received, the forward structure includes an aperture (e.g., inlet wire guide 106) through which the welding wire 44 is output, and the curved guide structure 70 is disposed between and coupled to the rear and forward structure apertures. In embodiments with the wire drive assembly 56 in the torch 18, this allows the curved guide structure 70 to route the welding wire 44 from the aperture 104 to a space between the feed rolls 108 and 110 even when the space is offset from the aperture 104 with respect to an axial centerline of the torch 18. The rear structure may be any structural component of the torch 18 disposed at a relatively upstream end of the welding torch 18, while the forward structure may be any structural component disposed at a relatively downstream end of the torch 18. For example, some embodiments of the torch 18 may not include the wire drive assembly 56 disposed therein, but instead rely on the wire drive assembly (e.g., feed rolls 50) in the wire feeder 14 to push the welding wire 44 through the torch 18. In such torches 18, the curved guide structure 70 may be coupled to the rear block 62 at one end and to a forward structure (e.g., barrel mount 72) located downstream of the rear block 62. The torch 18 then outputs the welding wire 44 from the barrel mount 72 through the nozzle 76 and toward a welding application downstream of the torch 18.

FIG. 4 is a top perspective view of internal components of the torch 18, including the curved guide structure 70. The curved guide structure 70 is coupled between the aperture 104 in the rear block 62 and the inlet wire guide 106 of the wire drive assembly 56, which aligns the welding wire 44 with the space between the feed rolls 108 and 110. The rear structure aperture (e.g., aperture 104) is aligned with a first axis 130, the forward structure aperture (e.g., inlet wire guide 106) is aligned with a second axis 136, and the first and second axes 130 and 136 are offset from each other. The first axis 130 passes through a center point 132 of the aperture 104 and extends in a longitudinal direction 134 of the torch 18. Similarly, the second axis 136 passes through the space between the feed rolls 108 and 110 through which the welding wire 44 passes and extends in the longitudinal direction 134. Indeed, the second axis 136 is aligned with the space between the feed rolls 108 and 110 so that the welding wire 44 may enter the wire drive assembly 56 at a point of tangency to the feed rolls 108 and 110. In embodiments without the wire drive assembly 56, the second axis 136 may be aligned with a center point of the barrel mount 72, or some other component that is relatively central to the torch 18.

Since the first axis 130 and the second axis 136 each extend in the longitudinal direction 134, they are parallel axes. However, the first and second axes 130 and 136 are offset from each other. The second axis 136, defined by the contact area between the feed rolls 108 and 110, does not pass through the center point 132 of the aperture 104. As shown in FIG. 4, a first offset 138 between the first and second axes 130 and 136 may be in a horizontal direction 140 relative to the torch 18. It should be noted that the horizontal direction 140 is generally perpendicular to a plane defined by a welding wire feed region (e.g., the contact area between the feed rolls 108 and 110). FIG. 5, which is a side view of the same components of the torch 18 in FIG. 4, shows a second offset 142 between the first and second axes 130 and 136 in a vertical direction 144 relative to the torch 18. The vertical direction 144 is generally parallel to the plane defined by the welding wire feed region. It should be noted that a first direction may be considered "generally parallel" or "substantially parallel" to a second direction (or plane) when the first direction is within a range of approximately 0-5 degrees of the second direction. Similarly, a first direction may be considered "generally perpendicular" or "substantially perpendicular" to a second direction (or plane) when the first direction is offset from the second direction to within a range of approximately 85-90 degrees.

Both of the illustrated horizontal and vertical directions 140 and 144 are perpendicular to the longitudinal direction 134. The first and second axes 130 and 136 are both substantially parallel to the longitudinal direction 134 and may be offset from one another in the horizontal direction 140 and/or the vertical direction 144. That is, the first and second axes 130 and 136 may be offset from one another in any direction substantially perpendicular to the longitudinal direction 134. In FIGS. 4 and 5, the first offset 138 of the first axis 130 relative to the second axis 136 in the horizontal direction 140 is approximately 0.125 inches to the left, and the second offset 142 of the first axis 130 relative to the second axis 136 in the vertical direction 144 is approximately 0.05 inches in the downward direction. In other embodiments, the first offset 138 and/or the second offset 142 may be any distance less than approximately 0.05, 0.1, 0.5, 1.0, or 1.5 inches. Offsetting the aperture 104 relative to the wire feed region between the feed rolls 108 and 110 may enable the use of a smaller rear block 62 than would be possible using a straight guide structure. Indeed, the aperture 104 may be offset in a horizontal and/or vertical direction that reduces a horizontal and/or vertical dimension of the rear block 62. This may decrease the overall size and weight of the torch 18, making it easier for an operator to manipulate the torch 18.

The curved guide structure 70 is designed to route the welding wire 44 from a structure (e.g., rear block 62) at an upstream end 146 of the torch 18 to a structure at a downstream end 148 of the torch 18. The curved guide structure 70 routes the welding wire 44 along a smoothly curving path between the aperture 104 and the inlet wire guide 106, because of the offsets 138 and 142 in the horizontal and vertical directions 140 and 144, respectively. In addition, the curved guide structure 70 has a substantially circular cross sectional area in order to smoothly convey the welding wire 44, which has a relatively circular cross sectional area. Further, the curved guide structure 70 may be generally S-shaped to facilitate the smooth feeding of the welding wire 44 therethrough, reducing an amount of undesired wear on the welding wire 44 traveling through the torch 18. For example, the curved guide structure 70 may include a first slight bend 164 approximately 40% along the length of the curved guide structure 70 from the rear block 62, and a second slight bend 165 approximately 70% along the length of the curved guide structure 70 from the rear block 62. In certain embodiments, the first slight bend 164 may bend the curved guide structure 70 up in the vertical direction 144 and to the right in the horizontal direction 140 with respect to the first axis 130 by an angle of approximately 2-5 degrees. In these embodiments, the second slight bend 165 may bend the curved guide structure 70 back by an angle of approximately 2-5 degrees toward the second axis 136.

The curved guide structure 70 may be especially useful for holding a replaceable welding wire liner between the offset apertures in the torch structures. FIG. 6 represents an embodiment of the curved guide structure 70 receiving a wire liner 160. The wire liner 160 is a flexible conduit designed to offer additional protection of the welding wire 44 as it passes through the torch 18 and/or the weld cable 54. In certain embodiments, the wire liner 160 is positioned in the curved guide structure 70, extending from the rear block 62 to the wire drive assembly 56. In other embodiments, the wire liner 160 is longer and extends through the curved guide structure 70 and through a separate guide structure in the weld cable 54. In this way, the wire liner 160 may continuously extend from the wire feeder 14 to the wire drive assembly 56 in the torch 18. The wire liner 160 is made from plastic or a similar material that is flexible, yet rigid enough to be pushed through the curved guide structure 70. The wire liner 160 may be replaceable as it is expected to endure a certain amount of wear throughout its use. Indeed, over time, the wire liner 160 may become clogged with shavings from the outer surface of the welding wire 44.

FIG. 6 shows the insertion of a new wire liner 160 that follows the removal of an old wire liner during wire liner replacement. The wire liner 160 is inserted through the aperture 104 in the rear block 62 (or other rear structure of the torch 18) as indicated by arrow 162. As the wire liner 160 approaches the bends 164, 165 in the curved guide structure 70, the wire liner 160 conforms to the shape of the curved guide structure 70. The wire liner 160 may be secured in place when the wire liner 160 extends to the wire drive assembly 56 from either the rear block 62 or the wire feeder 14, depending on the length of the wire liner 160 used. Once the wire liner 160 is in place, the welding wire 44 may be inserted through an upstream end 166 of the wire liner 160 and snaked through the wire liner 160. Once the welding wire 44 is threaded between the feed rolls 108 and 110 of the wire drive assembly 56, the wire drive assembly 56 pulls the welding wire 44 through the wire liner 160. The wire liner 160 may act as a barrier between the welding wire 44 and the curved guide structure 70, or any other structures, in the torch 18. In particular, the wire liner 160 may protect the welding wire 44 from sharp or hard edges of the curved guide structure 70 and/or various structural interfaces or transitions (e.g., between the curved guide structure 70 and the rear block 62, between the curved guide structure 70 and the wire drive assembly 56, and so forth).

Figure 7:
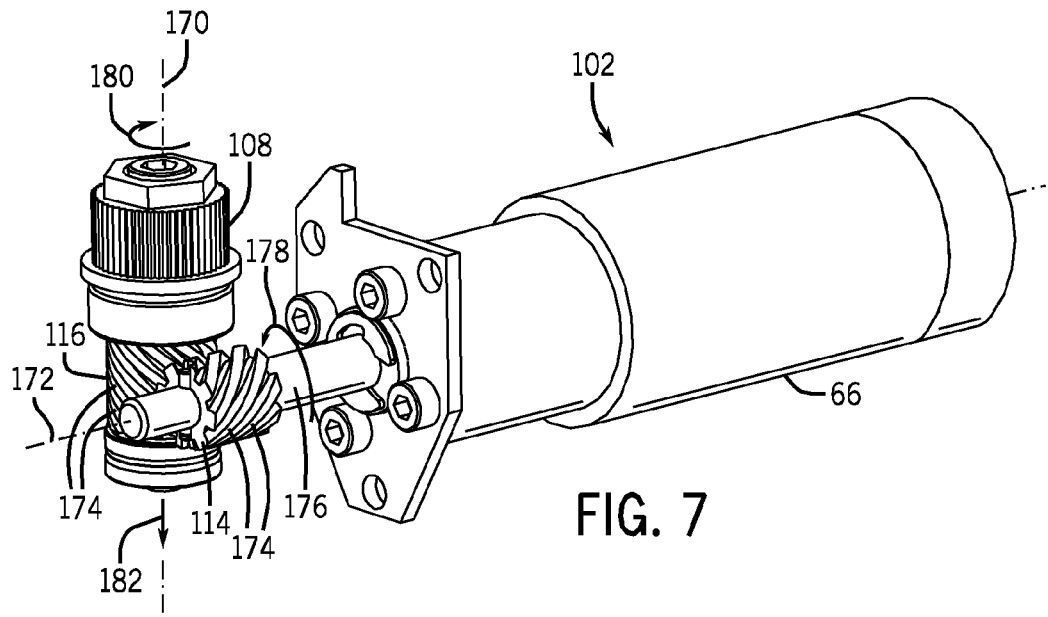
FIG. 7 is a perspective view of an embodiment of a motor assembly used in the welding torch of FIG. 3.

FIG. 7 is a perspective view of an embodiment of the motor assembly 102 used in the torch 18 of FIG. 3. The motor assembly 102 is configured to rotate the driver feed roll 108 about a first axis 170. The first axis 170 is substantially parallel to the vertical direction 144 of the torch 18. The driver feed roll 108 is disposed opposite the idler feed roll 110 across a welding wire feed region, as discussed previously. The two feed rolls 108 and 110 are configured to advance the welding wire 44 through the torch 18. In certain embodiments, the driver feed roll 108 may be knurled in order to grip the welding wire 44 effectively, while the idler feed roll 110 may include a groove for maintaining the alignment of the welding wire 44 between the feed rolls 108 and 110.

The motor assembly 102 includes the driven helical gear 116, which is axially coupled with the driver feed roll 108 along the first axis 170. Consequently, the driven helical gear 116 is configured to rotate the driver feed roll 108 about the first axis 170 as the driven helical gear 116 rotates about the first axis 170. The motor assembly 102 also includes the driving helical gear 114, which is operatively coupled with the driven helical gear 116 and configured to rotate about a second axis 172. The second axis 172 is generally parallel to the longitudinal direction 134 and perpendicular to the first axis 170. The driven helical gear 116 is engaged with the driving helical gear 114 such that rotation of the driving helical gear 114 about the second axis 172 causes the driven helical gear 116 to rotate about the first axis 170.

The motor 66, being aligned with the second axis 172, is configured to rotate a mechanical component (e.g., the driving helical gear 114 and a short shaft 176 that couples the driving helical gear 114 to the motor 66) about the second axis 172. The mechanical component is operatively coupled (e.g., via the driven helical gear 116) to the driver feed roll 108 so that, in response to the rotation of the mechanical component, the feed rolls 108 and 110 advance the welding wire 44 through the torch 18. In the illustrated embodiment, this involves the motor 66 rotating the driving helical gear 114, which rotates the driven helical gear 116 and the driver feed roll 108. To this end, the motor 66 is configured to rotate the short shaft 176 and the coupled driving helical gear 114 about the second axis 172. The motor 66 drives a rotation 178 of the driving helical gear 114 about the second axis 172, which drives a rotation 180 of the driven helical gear 116 about the first axis 170. This causes the driver feed roll 108 to rotate about the first axis 170, thereby pulling the welding wire 44 through the wire feed region between the feed rolls 108 and 110. As discussed in further detail below, the second axis 172 may be offset from a plane defined by the wire feed region between the feed rolls 108 and 110.

The helical gears 114 and 116 are rotatably engaged via teeth 174. In the illustrated embodiment, the helical gears 114 and 116 are left-hand helical gears, but in other embodiments the helical gears 114 and 116 may be right-hand helical gears. The helical gears 114 and 116 should be of the same hand to maintain gear engagement as the helical gears 114 and 116 rotate about perpendicular axes 172 and 170. In certain embodiments, there may be the same or a different number of teeth 174 on the driving helical gear 114 as on the driven helical gear 116. The relation of the number of teeth 174 on each of the first and second helical gears 114 and 116 determines a gear ratio of the helical gears 114 and 116. For example, in the illustrated embodiment, the driving helical gear 114 has a smaller diameter, and thus fewer teeth 174, than the driven helical gear 116. This results in a gear reduction between the helical gears 114 and 116. In other words, the driving helical gear 114 makes a full rotation 178 about the second axis 172 in less time than it takes the driven helical gear 116 to make a full rotation 180 about the first axis 170. The rotational speed at which the motor 66 turns the driving helical gear 114 is thus reduced to a lower rotational speed of the driver feed roll 108. A gear ratio of 1:1.25 between the driving helical gear 114 and the driven helical gear 116 reduces the rotational speed of the driven helical gear 116, and the feed rolls 108 and 110, to 80% of the rotational speed output by the motor 66. The desired gear ratio of the helical gears 114 and 116 may depend on a shaft speed of the motor 66, a diameter of the driver feed roll 108, and a distance the second axis 172 is offset from a wire feed plane 190. This may determine whether the driving helical gear 114 has fewer, more, or the same number of teeth 174 as the driven helical gear 116.

When helical gears are arranged perpendicularly as shown, one of the gears generates an axial thrust force on the other. The illustrated helical gears 114 and 116 are arranged such that the driving helical gear 114 exerts an axial thrust force 182 on the driven helical gear 114 in the downward direction with respect to the first axis 170. This is due to the handedness of the helical gears 114 and 116, the offset of the motor 66, and the perpendicular axes 170 and 172. It may be desirable to arrange the helical gears 114 and 116 in this way so that the axial thrust force 182 on the driven helical gear 116 is in the direction of a support structure (e.g., the body 112 of the wire drive assembly 56). For example, the helical gears 114 and 116 may be configured with a certain handedness to facilitate applying the axial thrust force 182 in this direction. When assembled, the illustrated driver feed roll 108 may be press fit into the body 112 from above. If there is an insufficient press fit between bearings of the driven helical gear 116 and the body 112, an axial thrust force in the upward direction could lead the driven helical gear 116 and the driver feed roll 108 to lift out of the body 112. However, in the illustrated configuration, the downward axial thrust force 182 may draw the driven helical gear 116 and the driver feed roll 108 into a desired position in the body 112 of the wire drive assembly 56.

Figure 8:
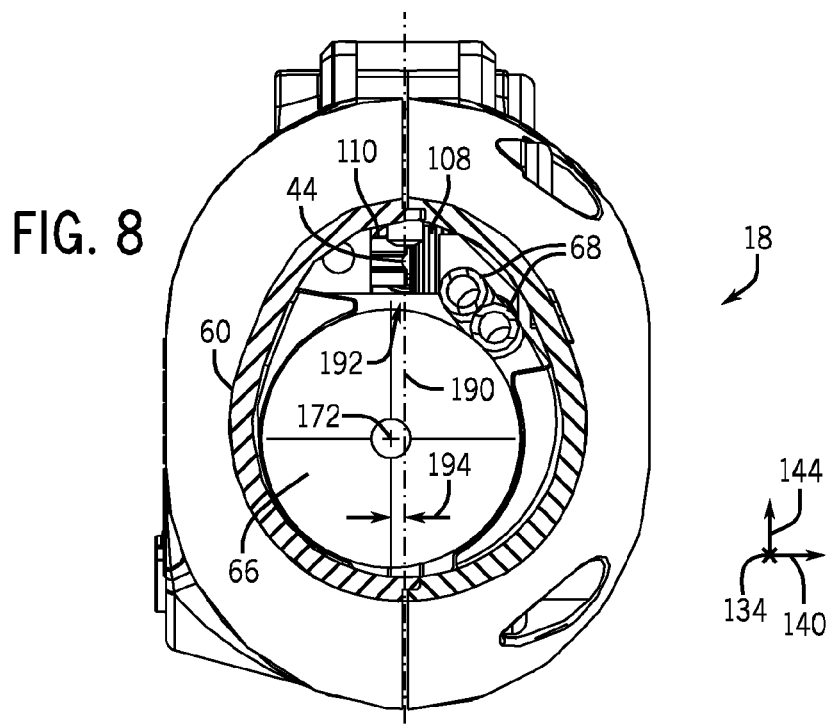
FIG. 8 is a rear cutaway view of an embodiment of the welding torch of FIG. 3 including an offset motor drive.
Figure 9:
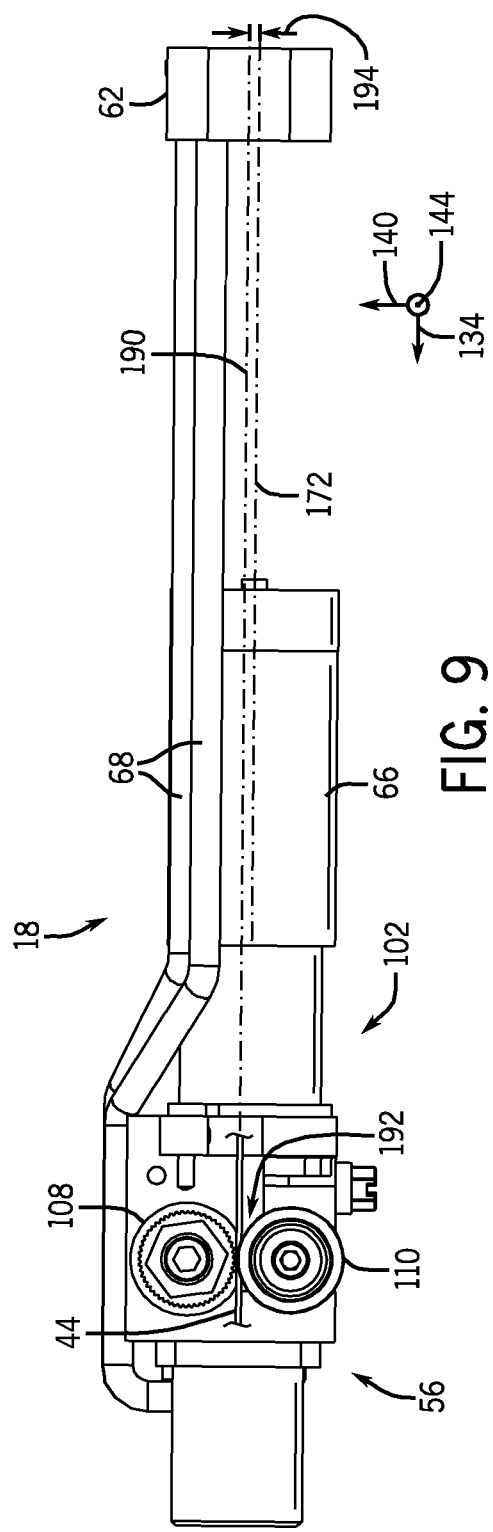
FIG. 9 is a top view of an embodiment of components of the welding torch of FIG. 8.

FIG. 8 is a rear cutaway view of an embodiment of the torch 18 having the motor 66 in an offset position. Specifically, the motor 66 is offset in the horizontal direction 140 from a wire feed plane 190. FIG. 9 is a top view of components of the torch 18, including the motor 66 offset from the wire feed plane 190. The wire feed plane 190 is a plane defined by a welding wire feed region 192 between the feed rolls 108 and 110. That is, the wire feed plane 190 is tangential to the contact area between the feed rolls 108 and 110, extending in both the vertical direction 144 and the longitudinal direction 134. The torch 18 is configured to feed the welding wire 44 through the wire feed plane 190 between the feed rolls 108 and 110. In the illustrated embodiment, the wire feed plane 190 bisects the torch 18 along its length, forming a vertical centerline of the torch 18. The motor assembly 102 may be configured so that the second axis 172, along which the motor 66 is aligned, is offset from the wire feed plane 190 in the horizontal direction 140. The distance of such an offset 194 between the wire feed plane 190 and the second axis 172 may be within a desired range of approximately 0.01-1.0 inches, approximately 0.02-0.75 inches, approximately 0.05-0.5 inches, or approximately 0.25 inches. In the illustrated embodiments, the motor 66 is offset horizontally to a first side (e.g., left) of the wire feed plane 190. This may increase an amount of interior space in the torch 18 on a second side of the wire feed plane 190 opposite the first side. Other components interior to the torch 18 may be disposed in the space along the second side. In the illustrated embodiment, for example, the torch 18 is arranged so that the conductor tubes 68 are disposed along the second side (e.g., right) of the wire feed plane 190 opposite the first side. In some embodiments, the curved guide structure 70 used to route the welding wire 44 from the aperture 104 to the welding wire feed region 192 may be configured such that the aperture 104 is offset from the wire feed plane 190 on the first side of the wire feed plane 190. This enables a relatively efficient use of space within the housing 60, making the torch 18 more compact. Other embodiments may employ different relative arrangements of the motor 66, curved guide structure 70, and conductor tubes 68. For example, the motor 66 may be offset on a first side of the wire feed plane 190, while both the aperture 104 is offset on an opposite side of the wire feed plane 190 and the conductor tubes are disposed along the first side.

It should be noted that the components of the motor assembly 102 in the torch 18 may be specifically designed to feed the welding wire 44 through the torch 18 at a desired range of wire feed speeds. The distance of the offset 194, type of motor 66 used, diameter of the driver feed roll 108, and gear ratio between the helical gears 114 and 116 may be specifically tuned to feed the welding wire 44 through the torch 18 at desired wire feed speeds while maintaining the compactness of the torch 18. For example, the offset 194 may be greater than that shown in FIGS. 8 and 9, and the diameter of the driving helical gear 114 may be increased to the same diameter as the driven helical gear 116, bringing the gear ratio to 1:1. The resultant range of rotational speeds of the driver feed roll 108 would then be the same as the range of rotational speeds applicable by the motor 66.

Figure 10:
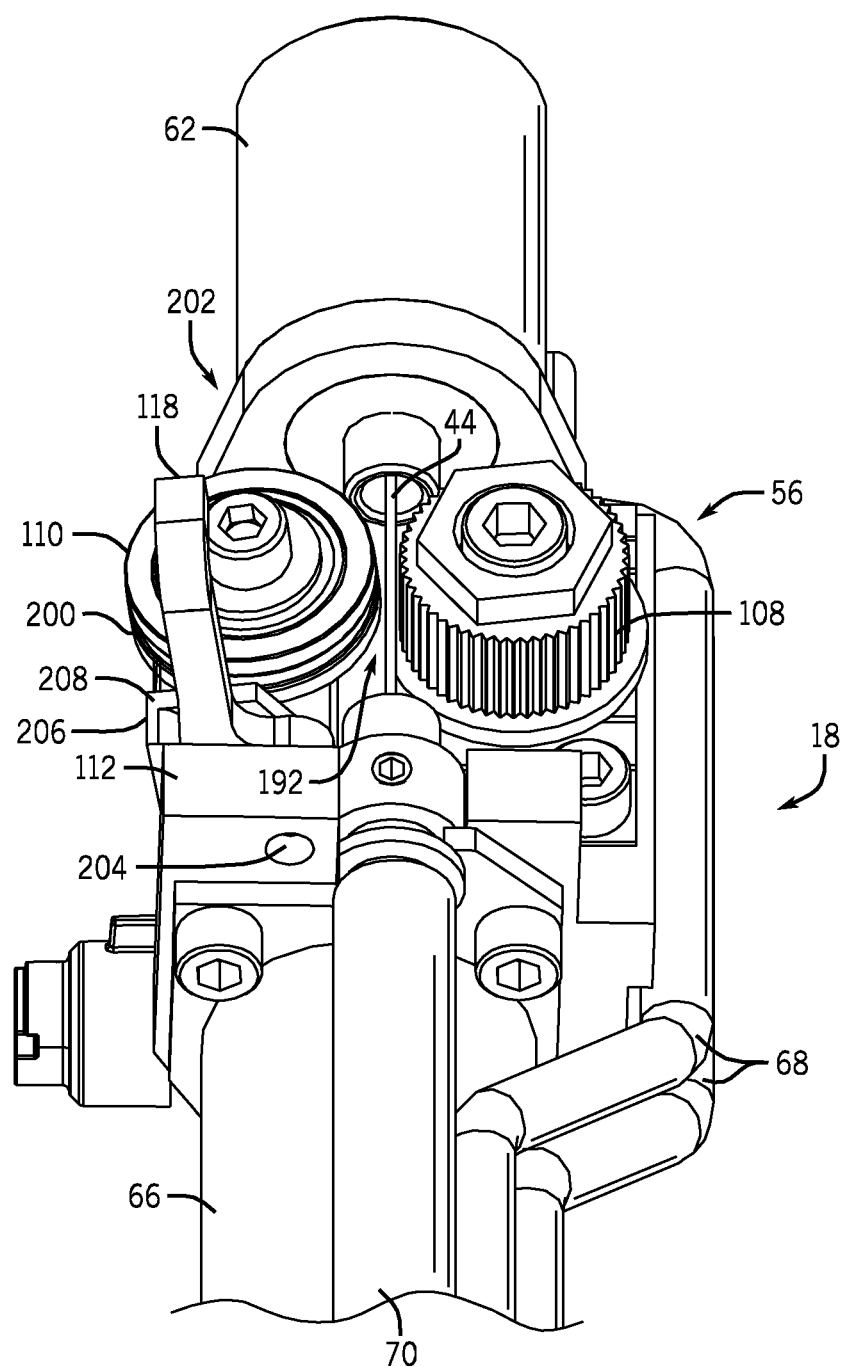
FIG. 10 is a perspective view of an embodiment of the welding torch of FIG. 3 including a lever for maintaining feed rolls in an open position.

FIG. 10 is a perspective view of an embodiment of components of the torch 18, including the lever 118 for adjusting a separation between the feed rolls 108 and 110. As discussed previously, the wire drive assembly 56 in the torch 18 is designed to feed the welding wire 44 toward a downstream welding application. The feed rolls 108 and 110 are configured to receive the welding wire 44 therebetween and pull the welding wire 44 through the torch 18. More specifically, the idler feed roll 110 holds the welding wire 44 in a groove 200 formed in the idler feed roll 110, and presses the welding wire 44 against the rotating driver feed roll 108. In this way, the rotation 180 of the driver feed roll 108 by the motor assembly 102 facilitates the feeding of the welding wire 44. During this process, the feed rolls 108 and 110 are in a feed position, the feed rolls 108 and 110 being adjacent to and/or in contact with each other.

Figure 11:
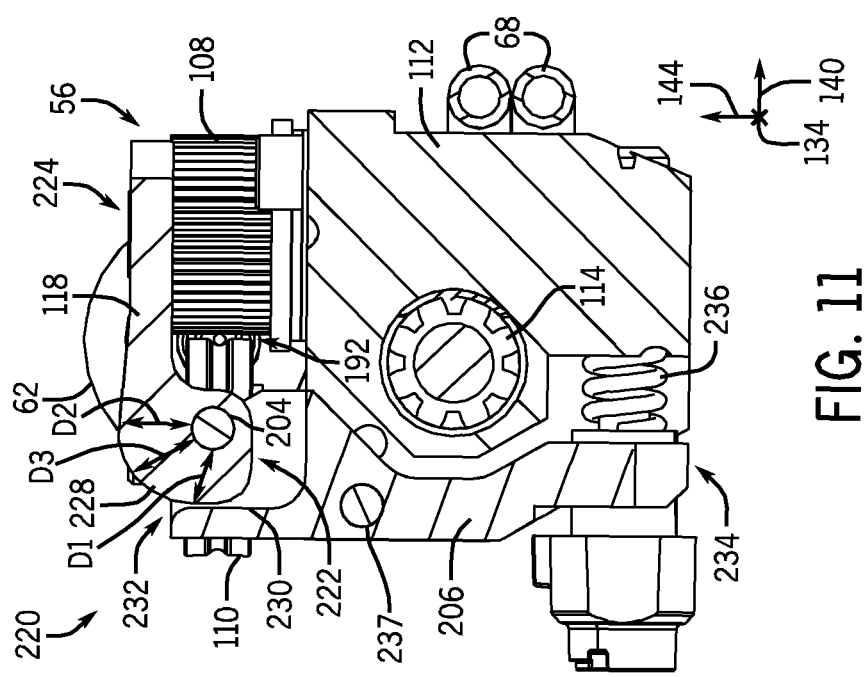
FIG. 11 is a rear cutaway view of an embodiment of a wire drive assembly used in the welding torch of FIG. 10 with the feed rolls in a feed position.

It may be desirable to selectively move the feed rolls 108 and 110 from the feed position to an open position 202, where the feed rolls 108 and 110 are separated. The open position 202 of the feed rolls 108 and 110, shown in FIG. 10, enables an operator to thread the welding wire 44 into the welding wire feed region 192 between the feed rolls 108 and 110. Once the welding wire 44 is properly positioned in alignment with the groove 200 of the idler feed roll 110, the feed rolls 108 and 110 may be repositioned to the feed position for feeding the welding wire 44 through the torch 18. The lever 118 is used to selectively move the feed rolls 108 and 110 between the open position 202 and a feed position 220 (e.g., as illustrated in FIG. 11). The lever 118 is also configured to maintain the feed rolls 108 and 110 in the open position 202 as desired by the operator. As previously mentioned, the idler feed roll 110 is adjacent to the driver feed roll 108 in the feed position 220, and the idler feed roll 110 is not adjacent to the driver feed roll 108 in the open position 202. By maintaining the feed rolls 108 and 110 in the open position 202 as shown, the lever 118 allows the operator to make adjustments to the welding wire 44, thread the welding wire 44, or service the wire drive assembly 56 using two hands. This is an improvement over systems in which the operator holds open the feed rolls 108 and 110 with one hand while threading the welding wire 44 with another hand.

In the illustrated embodiment, the lever 118 moves the idler feed roll 110 relative to the driver feed roll 108, and the driver feed roll 108 is rotatably attached to the body 112. However, this arrangement may be reversed in other embodiments. As previously mentioned, the idler feed roll 110 and the driver feed roll 108 are both configured to rotate with respect to the body 112 of the wire drive assembly 56. The lever 118 is configured to pivot about a lever joint of the body 112 and to maintain the idler feed roll 110 away from the driver feed roll 108 in response to the movement of the lever 118. In the illustrated embodiment, the lever joint is a pin 204 extending through the lever 118 and the body 112 so the lever 118 can pivot with respect to the body 112. However, any suitable joint mechanism may be used to rotatably couple the lever 118 with the body 112. The torch 18 also may include an arm 206 coupled to the idler feed roll 110 and configured to pivot relative to the body 112 when urged by the lever 118. FIG. 10 shows the lever 118 urging the arm 206 to pivot relative to the body 112, thereby moving the idler feed roll 110 away from the driver feed roll 108 and into the open position 202. In the illustrated embodiment, the arm 206 includes a shelf 208 for maintaining the lever 118 between the arm 206 and the body 112.

Figure 12:
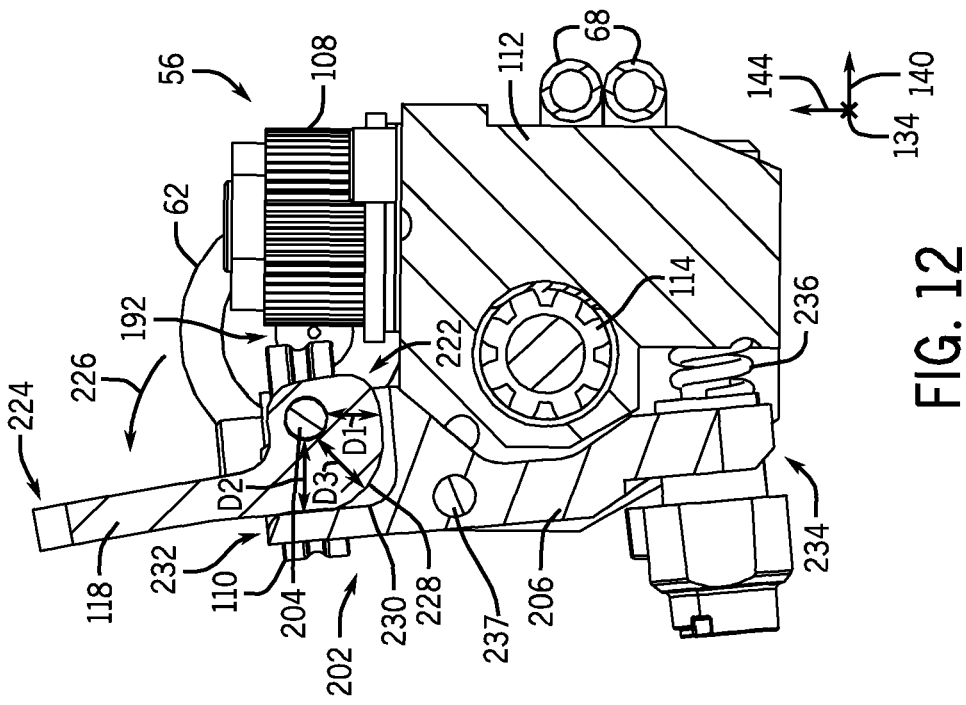
FIG. 12 is a rear cutaway view of an embodiment of the wire drive assembly of FIG. 11 with the feed rolls in the open position.

FIGS. 11 and 12 are rear cutaway views of an embodiment of the torch 18 having the feed rolls 108 and 110 in the feed position 220 and the open position 202, respectively. The illustrated lever 118 is designed to pivot at a first end 222 of the lever 118 about the pin 204 in response to movement of a second end 224 of the lever 118. The second end 224 is effectively a handle extending from the first end 222, and this handle may be raised or lowered to move the idler feed roll 110 between the open position 202 and the feed position 220. In general, the idler feed roll 110 may only be maintained in either the open position 202 or the feed position 220 without operator intervention insofar as the mechanical features (e.g., of the lever 118, spring 236, and so forth) tend to bias the lever 118 into one of these two positions. As illustrated in FIG. 11, the spring 236 maintains the idler feed roll 110 adjacent the driver feed roll 108 (i.e., in the feed position 220) when the second end 224 of the lever 118 is positioned in an orientation substantially perpendicular to the welding wire feed region 192. In other words, the handle of the second end 224 is generally aligned with the horizontal direction 140 of the torch 18 to maintain the feed rolls 108 and 110 in the feed position 220. As shown in FIG. 12, the lever 118 maintains the idler feed roll 110 away from the driver feed roll 108 (i.e., in the open position 202) when the second end 224 is positioned in an orientation substantially parallel to the welding wire feed region 192. That is, the handle of the second end 224 is generally aligned with the vertical direction 144 of the torch 18. In the illustrated embodiment, the substantially vertical orientation of the second end 224 is slightly beyond the vertical direction 144 in the rotational direction of arrow 226 (e.g., approximately 100 degrees from the horizontal direction 140). The orientation of the second end 224 relative to the body 112 for maintaining the open position 202 may be an orientation that is offset from first orientation for maintaining the feed position 220. For example, the second end 224 may be offset (e.g., arrow 226) from the first orientation along a plane by approximately 75-135 degrees, approximately 80-120 degrees, or approximately 90-115 degrees. This second orientation of the lever 118 may be offset from the first orientation along a plane that is generally defined by the horizontal and vertical directions 140 and 144 of the torch. That is, the plane in which the lever 118 pivots is substantially perpendicular to the longitudinal direction 134 of the torch.

As previously mentioned, the lever 118 may include a cam surface 228 for urging the arm 206 to pivot relative the body 112 as the lever 118 is pivoted about the pin 204. The cam surface 228 may be shaped such that a distance between the pin 204 and the cam surface 228 changes from one end of the cam surface 228 to another. In this way, as the lever 118 changes orientation with respect to the pin 204, the cam surface 228 may urge the arm 206 to pivot a greater or lesser distance relative to the body 112. For example, in the illustrated embodiment the cam surface 228 is a distance D1 away from the pin 204 at one end of the cam surface 228, and a second distance D2 away from the pin 204 at an opposite end of the cam surface 228. In addition, the cam surface 228 may protrude a third distance D3 from the pin 204 between the first two ends of the cam surface 228. The first distance D1 may be less than the second distance D2, such that the cam surface 228 urges the arm 206 a greater distance as the lever 118 rotates about the pin 204. The third distance D3 may be greater than both the first and second distances D1 and D2, such that the cam surface 228 keeps the arm 206 from pivoting back once the idler feed roll 110 is in the open position 202, as described in detail below.

In order to move the idler feed roll 110 from the feed position 220 to the open position 202, the lever 118 may be rotated about the pin 204 in the direction indicated by the arrow 226. As the lever 118 rotates, the cam surface 228 of the lever 118 engages a contact surface 230 of the arm 206. The contact surface 230 is at a first end 232 of the arm 206 opposite a second end 234 of the arm 206, and the second end 234 is coupled to a spring 236. As the lever 118 continues to rotate, the cam surface 228 urges the first end 232 of the arm 206 away from the driver feed roll 108. The arm 206 pivots about a pin 237 extending through the arm 206 and the body 112 so that the second end 234 moves in a direction that compresses the spring 236. As the lever 118 rotates still further, the cam surface 228 pivots out of contact with the contact surface 230, and the spring 236 releases a restoring force to move the first end 232 of the arm 206 back toward the driver feed roll 108. However, the now vertically oriented lever 118 stops the arm 206 from pivoting all the way back to its original position. Because of the restoring force of the spring 236 acting on the arm 206, the lever 118 becomes wedged in its position between the pin 204 and the arm 206, and may not pivot back to the horizontal orientation on its own. Thus, the lever 118 maintains the feed rolls 108 and 110 in the open position 202, without a continuous force applied by an operator.

To return the feed rolls 108 and 110 to the feed position 220, the operator may exert a force on the second end 224 of the lever 118 to pivot the lever 118 back to the relatively horizontal position. Throughout the rotation of the lever 118, the cam surface 228 urges the first end 232 of the arm 206 away from the body 112 slightly before losing contact with the contact surface 230. This releases the arm 206 to pivot, returning the attached idler feed roll 110 toward the driver feed roll 108. In addition, it will be appreciated that the spring 236 biases the first end 232 of the arm 206 (and, thus, the idler feed roll 110) toward the driver feed roll 108. Thus, the spring 236 maintains the idler feed roll 110 in the feed position 220 when the lever is positioned in the relatively horizontal orientation.

Figure 13:
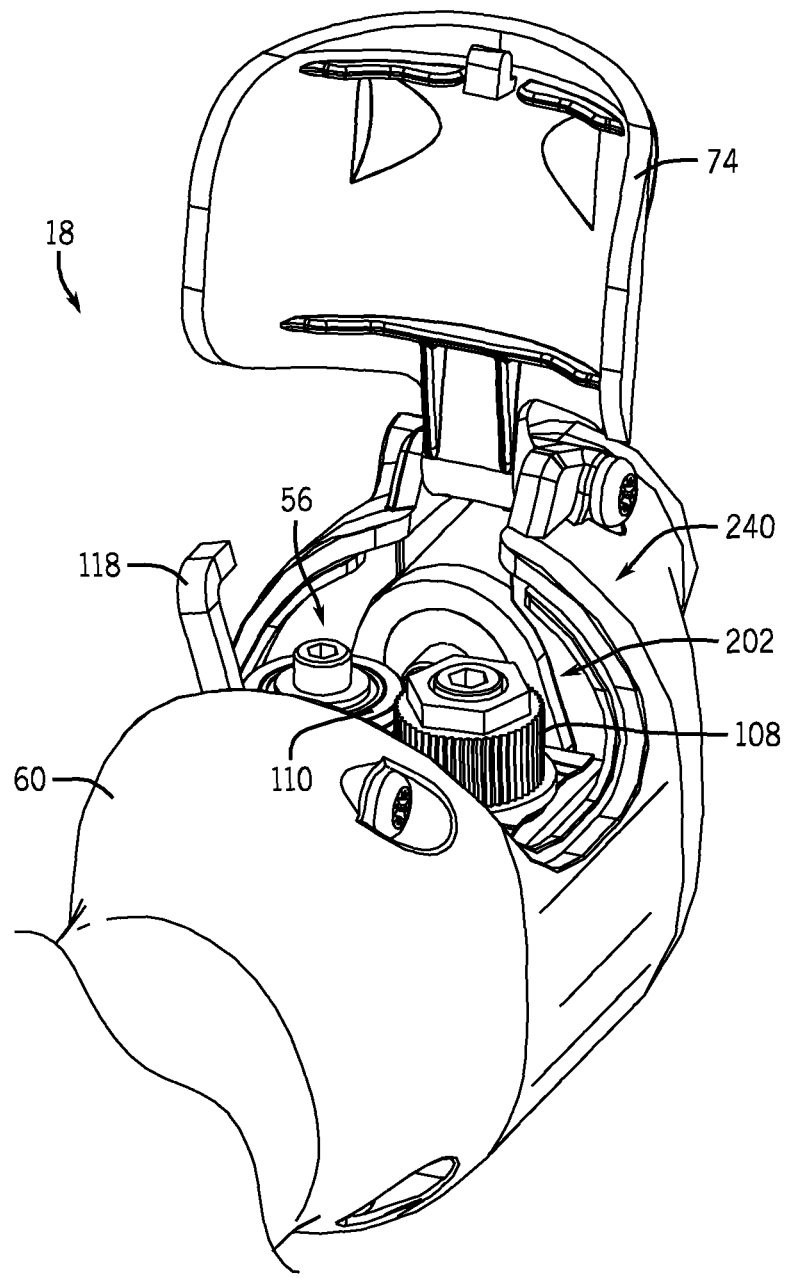
FIG. 13 is a perspective view of an embodiment of the welding torch of FIG. 3 including a door opened to expose the wire drive assembly.

It should be noted that other embodiments may employ other mechanisms for pivoting a lever to secure the feed rolls 108 and 110 in the open position 202. However, it is important that torch 18 is designed to maintain the feed rolls 108 and 110 in the feed position 220 when the extended second end 224 of the lever 118 is positioned in a relatively horizontal orientation. This enables a desired level of compactness of the wire drive assembly 56 while feeding the welding wire 44 through the torch 18. FIG. 13 is a perspective view of an embodiment of the torch 18, which includes an opening 240 that may be covered by the door 74 of the housing 60. The door 74 is opened to expose the wire drive assembly 56 (e.g., at least the feed rolls 108 and 110 and the lever 118). In the illustrated embodiment, the lever 118 is configured to block the door 74 from closing when the lever 118 holds the idler feed roll 110 in the open position 202. That is, the lever 118 is positioned in a generally vertical orientation to maintain the feed rolls 108 and 110 in the open position 202. In this orientation, the lever 118 may block the door 74 from closing over the opening 240. This may keep an operator from forgetting to disengage the lever 118 from the open position 202 before closing the door 74 and attempting to weld with the torch 18. When the door 74 does not close, the operator may return the lever 118 to the generally horizontal orientation of the feed position 220 so that the door 74 is able to close over the compact wire drive assembly 56.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding torch assembly, comprising:
a body;
a first feed roll coupled to the body;
a second feed roll configured to rotate with respect to the body, wherein the second feed roll is coupled to an arm, and the second feed roll is movable relative to the first feed roll between a feed position and an open position; and
a lever configured to move between a closed position and an opened position to move the second feed roll between the feed position and the open position, the lever having a first end rotatably coupled to the body and a second end extending from the first end, wherein the second feed roll is adjacent to the first feed roll in the feed position, and the second feed roll is not adjacent to the first feed roll in the open position, the lever comprises a rounded surface for engaging the arm, rotation of the lever with respect to the body and the arm urges a first end of the arm coupled to the second feed roll toward or away from the first feed roll, and a force of the arm on the lever when the lever is in the opened position biases the lever toward the opened position.

2. The welding torch assembly of claim 1, wherein the arm is rotatably coupled to the body via a pin, and the arm is coupled to a spring at a second end of the arm opposite the first end of the arm.

3. The welding torch assembly of claim 2, wherein the spring biases the second feed roll toward the first feed roll, and the spring maintains the second feed roll in the feed position when the lever is positioned in a first orientation relative to the body.

4. The welding torch assembly of claim 3, wherein the lever is configured to maintain the second feed roll in the open position when the lever is positioned in a second orientation relative to the body, the second orientation being offset from the first orientation by approximately 90-115 degrees along a plane.

5. The welding torch assembly of claim 1, comprising a housing formed about the body, the housing having an opening formed by a door that rotates open to expose at least one of the lever, the first feed roll, and the second feed roll.

6. The welding torch assembly of claim 5, wherein the lever blocks the door from closing when the second feed roll is in the open position.

7. The welding torch assembly of claim 1, wherein the first and second feed rolls are configured to feed welding wire through the welding torch assembly and toward a welding application when the second feed roll is in the feed position.

* * * * *